United States Patent
Jones et al.

(10) Patent No.: US 10,099,960 B2
(45) Date of Patent: Oct. 16, 2018

(54) FLOORING

(71) Applicant: DYCEM LIMITED, Bristol (GB)

(72) Inventors: Andrew Jones, Bristol (GB); Mark Dalziel, Bristol (GB)

(73) Assignee: DYCEM LIMITED, Bristol (GB)

( * ) Notice: Subject to any disclaimer, the term of this patent is extended or adjusted under 35 U.S.C. 154(b) by 4 days.

(21) Appl. No.: 14/565,926

(22) Filed: Dec. 10, 2014

(65) Prior Publication Data

US 2016/0135660 A1    May 19, 2016

(30) Foreign Application Priority Data

Nov. 18, 2014 (GB) .................................. 1420480.4

(51) Int. Cl.
| | | |
|---|---|---|
| C03C 25/42 | (2006.01) | |
| A47G 27/02 | (2006.01) | |
| C03C 25/32 | (2018.01) | |
| C03C 25/323 | (2018.01) | |

(52) U.S. Cl.
CPC .......... *C03C 25/42* (2013.01); *A47G 27/0206* (2013.01); *C03C 25/323* (2013.01)

(58) Field of Classification Search
None
See application file for complete search history.

(56) References Cited

U.S. PATENT DOCUMENTS

| | | | | |
|---|---|---|---|---|
| 3,717,897 A * | 2/1973 | Amos | ................... | B08B 7/0028 134/10 |
| 4,559,250 A * | 12/1985 | Paige | ................... | A47L 23/266 15/215 |
| 4,746,560 A | 5/1988 | Goeden | | |
| 5,772,941 A * | 6/1998 | Nakano | ..................... | B44C 1/24 264/175 |
| 6,844,058 B2 * | 1/2005 | Blum | ..................... | A47L 23/22 15/104.002 |
| 6,933,043 B1 * | 8/2005 | Son | ......................... | B32B 27/08 428/213 |
| 2002/0136862 A1 * | 9/2002 | Dong | ..................... | B32B 21/08 428/150 |

(Continued)

FOREIGN PATENT DOCUMENTS

| | | |
|---|---|---|
| EP | 1681008 A1 | 7/2006 |
| WO | 2006114599 A1 | 11/2006 |

OTHER PUBLICATIONS

Examination Report for Application No. GB1420480.4 dated Jun. 24, 2015.

(Continued)

*Primary Examiner* — Laura C Powers
(74) *Attorney, Agent, or Firm* — Pearne & Gordon LLP

(57) ABSTRACT

A contamination control mat 10 comprising a support layer 16 which is coated on a top surface with a polymeric contamination control layer 17, wherein the support layer 16 comprises a glass fiber reinforced polymer that is printed on a top surface, the polymeric contamination control layer 17 is transparent or translucent, and the printed surface is visible through the polymeric contamination control layer. This provides a thin yet rigid and stable mat 10 that can also display printed information that is protected from damage. The mat 10 is primarily used to meet contamination control needs.

16 Claims, 1 Drawing Sheet

(56) References Cited

U.S. PATENT DOCUMENTS

2005/0129892 A1    6/2005  Beyer
2006/0156948 A1*   7/2006  Hendriks ............... A01N 25/34
                                                       106/15.05

OTHER PUBLICATIONS

International Search Report and Written Opinion dated Apr. 14, 2016 for PCT/GB2015/053434.
Dycem, "Almirall Spain," brochure (web version); available at https://www.dycem-cc.com/sites/all/themes/dycem/images/Almirall%20-%20Spain%20-%20Web%20version.pdf; accessed Sep. 19, 2016.
Dycem, "Dycem Contamination Control You Can Trust," brochure (web version), available at https://www.dycem-cc.com/sites/all/themes/dycem/images/UK_CleanZone-Lite_Minibrochure_web.pdf; accessed Sep. 19, 2016.

* cited by examiner

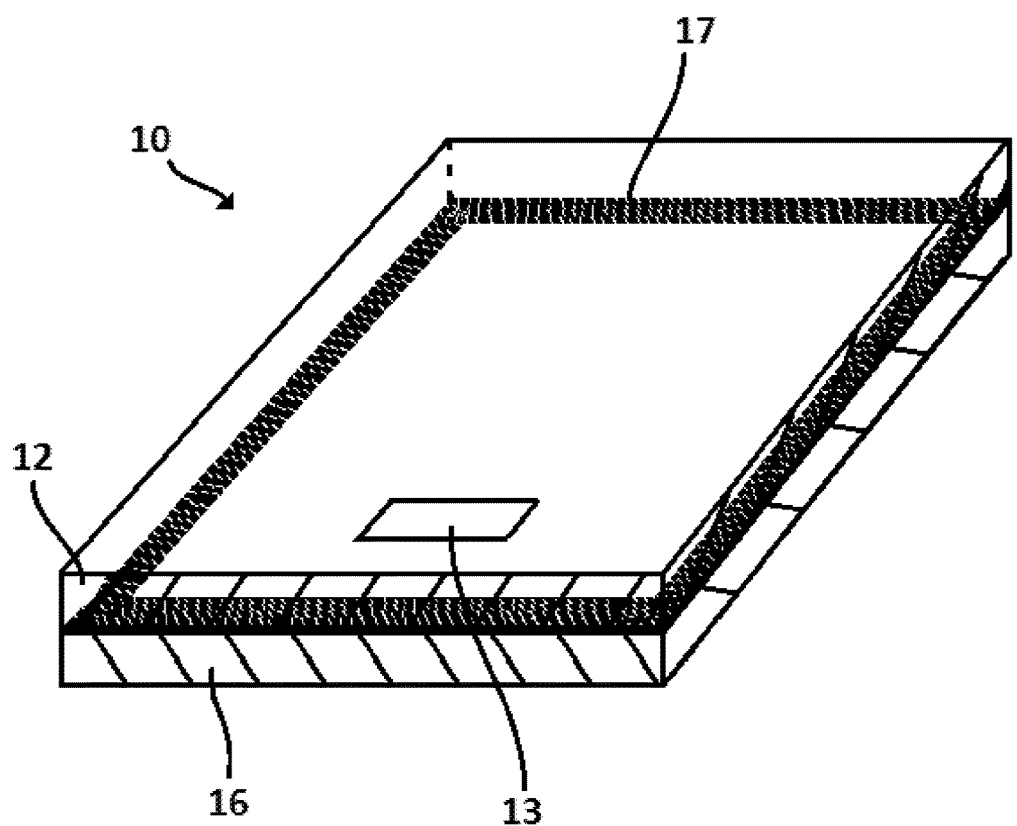

FLOORING

FIELD OF INVENTION

This invention relates to flooring, in particular, flooring for use in contamination control situations.

BACKGROUND TO THE INVENTION

Maintaining a controlled environment is essential in many academic, industrial and medical settings, and controlling contamination entering that environment is very important. For example, many hospitals, factories, food preparation areas, spray-paint booths and laboratories utilise a controlled environment, which may be referred to as a cleanroom. Precautions are taken such as subjecting cleanroom staff to strict clothing regulations and using a gowning room where the staff can change clothes under "controlled" conditions so as to prevent any particulates from entering from the outside environment. Certain areas in a cleanroom may have more stringent measures than others, with packaging areas, corridors, gowning rooms and transfer hatches being incorporated to maintain strict contamination control measures.

In hospitals, cleanroom precautions can be used to try to reduce the incidence of infectious diseases spreading. In industry, particularly in the pharmaceutical, electronics, aerospace, catering, automotive, biomedical, IT, nuclear, optical and medical devices industries, it is often essential to ensure that products are free from contamination. Contamination of a controlled environment poses a threat to product processes, the consequences of which are lower product yields, raised costs and decreased profits.

Contaminants are particles that enter an environment where they may potentially have a negative effect. There are many types of contaminants and they can have a wide variety of effects on different environments. Contaminants can be bacteria or other organisms that are potentially harmful to their surroundings. More familiar contaminants can be things such as dust and dirt.

Contaminants can be carried on any surface entering a controlled environment, or in the air. Particles can be suspended in the air for hours where they undergo rapid proliferation, contaminating the surrounding environment. Once there is no movement and turbulence stops, airborne contaminants fall. If they fall onto an unprotected floor they may rise again and be redistributed into the air as a result of the vortices created by the movement of personnel and wheeled traffic.

Studies have shown that over 80% of contamination enters a controlled environment through entrances and exits, mostly at or near floor level. As a result of this, attempts have been made to reduce the contamination entering a controlled environment by using particular floor coverings.

It is known to use particular floor coverings in entry and exit areas to controlled environments to attract, collect and retain foot and wheel borne contaminants, thereby reducing the contamination entering the controlled environment.

One type of flooring, known as polymeric matting, is particularly effective in certain situations in controlling particulate contamination. It is semi-permanently installed and can be cleaned as required. Dycem's Protectamat flooring system is an example of this. The polymeric matting comprises a single layer of polymer, usually a specially blended polymer formulation comprising polyester plasticisers leading to a tack that can attract and bind contaminants. This is typically at least 7 mm thick, making it heavy to manoeuvre. As noted above, this is a semi-permanent or permanent solution, in that the polymeric matting is particularly long-lasting and can be used for 3-5 years before replacement. This works very well when long term contamination control is required and the operator has sufficient resources to invest in such a system. However, it is less suitable for a situation where contamination control flooring is needed for a short period or at a low cost, for example, a testing laboratory, where testing is going on for a few days or for a few weeks.

"Peel off" mats, also known as adhesive floor mats or tacky mats, are also used in contamination control situations particularly where the need for contamination control is short lived, or there is not enough resource to fund installation of permanent contamination control flooring. These mats comprise a laminate of thin (0.1 to 0.2 mm) synthetic material layers, typically thirty layers, which are stuck together by a pressure sensitive adhesive to form a mat which is several millimeters thick. The mat is then placed on a floor to capture contaminants, for example, from feet or the wheels of trolleys. In use, the upper layer of a mat is removed from the base on a regular basis, exposing a new clean layer.

These "peel off" mats have several disadvantages. Firstly, and most importantly, the peel off mats do not work very well in comparison to polymeric matting. The surface tack is not as good as polymeric matting and does not retain nearly as many contaminants. Second, adhesive can be removed from the uppermost layer to adjacent floor surfaces by feet and wheels which can itself attract contaminants, meaning that peel off mats can be counterproductive by actually encouraging contaminants into the controlled area. Third, when an upper layer is removed from the mat it creates a considerable volume of waste which is difficult to recycle. Fourth, when removing an upper layer, contaminate particles can be released which may be hazardous to a user who may breath them in.

It is an object of the invention to overcome, or at least to mitigate, the disadvantages of prior art products.

SUMMARY OF THE INVENTION

According to a first aspect, the invention provides a contamination control mat comprising: a support layer which is coated on a top surface with a polymeric contamination control layer; wherein the support layer comprises a glass fibre reinforced polymer that is 1 mm to 2 mm thick and the top surface of the support layer is printed; the polymeric contamination control layer is 0.5 mm to 2.5 mm thick, and is transparent or translucent, so that the print on the support layer is visible through the polymeric contamination control layer.

By using a reinforced polymeric support layer coated on a top surface with a polymeric contamination control layer, the invention provides a mat with the contamination control of a polymeric mat but in a much thinner and more easily handled format. In contrast to the 7 mm thick polymer mats of the prior art, the present invention can provide a functioning contamination control mat with a thickness of around 1.5 to 4.5 mm. By reducing the amount of polymer required the mat is less expensive to manufacture. The reduced weight and increased flexibility of a thinner material also benefit packing, transport and installation operations. The present invention therefore also provides a mat that can be conveniently used as a temporary installation, avoiding the waste generated by a peel off mat typically used in this situation. The mat may also be treated as one-use, being disposed of after two to three month's use.

Using a support layer comprising a polymer reinforced with glass fibres provides multiple advantages. The rigidity of the support layer helps to prevent localised folding, crumpling or wrinkling of the mat in response to, for example, wheeled traffic.

Furthermore, the rigidity provided by the support layer helps to prevent localised depressions forming in the mat that could facilitate pooling of liquids. These depressions provide ideal locations for microorganisms to collect and multiply and the contour of the depression may also form a natural defence against standard cleaning operations. Mats solely comprising flexible materials can display depressions through a repetition of any contours of the floor below, for example, the lines between tiles of a tiled floor. The rigidity of the mat therefore allows the mats to be installed rapidly on uneven flooring without creating the potential for pooling.

While the glass fibres provide rigidity, a support layer can be created that also has enough flexibility to allow the mat to be rolled up for storage.

Printing may be desired, for example, to provide a border that guides users over the contamination control area. However, any printing on the top of the mat would be exposed to traffic and cleaning operations that could lead to damage. Printing on a contamination control polymeric layer may also interfere with contamination control properties. Equally, contamination control substances may interfere with the stability of the printed ink. In the past, printed material has been presented on edging strips rather than on the contamination control area itself.

In the present invention, it is the top surface of the support layer that is printed and not the polymeric contamination control layer or a separate edging strip. The printing is visible through a transparent or translucent polymeric contamination control layer. Surprisingly, the invention provides a way of displaying printing that is protected, but without sacrificing the thinness of the contamination control mat. This is because the contamination control surface provides three discrete functions: a) contamination control; b) protection of printing on the top surface of the support layer; and c) visibility of printing on the top surface of the support layer.

Furthermore, as the appearance of the top of the mat is different from the bottom, a visual cue is provided to help prevent installation of the mat in an upside down configuration.

The polymeric contamination control layer may comprise a blend of polymer and polyester plasticisers. This allows the polymeric contamination control layer to have appropriate flexibility and contamination control properties.

The contamination control may operate simply by trapping contaminants such as microbes. In addition, the polymeric contamination control layer may comprise at least one antimicrobial agent to actively kill microbes that contact the mat. The antimicrobial agent may be silver nitrate.

The support layer may be a single colour. This provides a solid background for printing on. The colour may be in contrast to the polymeric contamination control layer, further assisting the visual indicator as to installation orientation.

The top surface of the support layer may have a printed border. The border may outline the contamination control zone such that traffic can be directed over the contamination control zone. Optionally, the entire top surface of the support layer may be printed. For example, the entire top surface could be printed with a single colour, which would provide the colour of the contamination control mat in general. This would be in contrast to tinting the support layer or contamination control layer polymers. The top surface could also be printed with a single background colour and also letters, numbers, words, phrases, patterns, images, or combinations thereof in different colours.

The top surface of the support layer may have printing on it that comprises an ink that is cured using ultraviolet (UV) light. UV curable inks such as Oce IJC258 manufactured by Canon work particularly well. Such inks are cured without bleeding of the ink occurring. The printed surface is where two layers join. UV curable inks are particularly good at preventing delamination of the two layers in the region of the UV curable ink. A further advantage is that the colour of the mat may be set by printing the entire top surface of the support layer, rather than tinting the polymer.

Usually, the contamination control would consist of the support layer and the polymeric contamination control layer. However, it is possible to have further layers. At least one layer may be interposed between the support layer and the polymeric contamination control layer. Such a layer must also allow any printing on the support layer to be visible. An interposed layer may provide features such as further support or further contamination control properties. A bottom face of the support layer may also be coated with a further layer, for example an insulating layer, grip layer or layer that further distinguishes the top of the mat from the bottom.

According to a second aspect, the invention provides a method of providing contamination control, the method comprising deploying a contamination control mat according to the first aspect of the invention on a floor in an environment where contamination is to be controlled, such that the polymeric contamination control layer is uppermost.

According to a third aspect, the invention provides a method of making a contamination control mat according to the first aspect of the invention, the method comprising the steps of a) providing a polymeric layer reinforced with glass fibres as a support layer, b) printing on the top surface of the support layer, and c) coating a top surface of the support layer with a transparent or translucent polymeric contamination control layer.

BRIEF DESCRIPTION OF THE DRAWINGS

The invention will now be described by way of example only with reference to the accompanying drawing, FIG. 1, which is a schematic perspective view of a mat that is an embodiment of the invention.

DESCRIPTION

The invention provides a contamination control mat comprising a support layer which is coated on a top surface with a polymeric contamination control layer. By support, we mean that the layer generally provides strength to the mat. The support layer comprises a glass fibre reinforced polymer. By glass fibre reinforced polymer, we are referring to a substrate comprising a polymer comprising glass fibres. Any glass fibre reinforced polymer layer of thickness 1-2 mm can be used and suitable materials are known to the person skilled in the art. For example, the inventors have, surprisingly, found that the Sarlibase Acoustique underflooring, manufactured by Forbo-Sarlino, can act as an excellent support layer in the contamination control mat of the invention. This is a flooring underlayer typically used for providing acoustic soundproofing. It is used as an underlayer for a flexible flooring, such as vinyl flooring, that is placed on top of it.

In one embodiment the support layer has a manufacturing direction tensile strength of 400-800 N, preferably about 606 N, and a cross-direction tensile strength of 300-600 N, preferably about 440 N. It has a tear resistance in the manufacturing and cross-direction of 20-30 N, preferably about 23 N, and a density of 1,000 to 1,500 kg/m$^2$, preferably about 1,370 kg/m$^2$.

The support layer has a top surface. By top surface, we are referring to one of the two opposing large surfaces. The top surface is coated with a polymeric contamination control layer. By this, we mean that the top surface of the support layer is covered with a polymeric contamination control layer.

The top surface is printed. In other words, the top surface has printing on it. The printing may have been performed by any standard automated printing apparatus or by hand. An ink that is compatible with the polymer layers should be used for the printing. The printing may be of a letter, number, word, phrase, pattern, image, or combination thereof. The printing may be of any colour, however, a colour that is in contrast to the colour of the support layer would assist with visibility.

The top surface of the support layer may be printed with a border. The border is a strip that runs around the outer edges of the mat to mark the border of the contamination control zone. The border may be a solid colour, a pattern, an image or combination thereof. The printing may provide other information, such as a logo or safety warning.

The polymeric contamination control layer is transparent or translucent. By this, we mean that the polymeric contamination control layer is sufficiently transparent or translucent that the printing is visible through the layer. This layer may be coloured, as long as the transparency or translucency properties are preserved. By stating that the printing is visible through the polymeric contamination control layer, we mean that the printing is also visible through any other layers provided between the polymeric contamination control layer and the printing.

The support layer is 1 mm to 2 mm thick and the polymeric contamination control layer is 0.5 mm to 2.5 mm thick. A thinner mat would be too delicate for manufacture and would lead to inconsistency within the manufactured product. As well as requiring more material, a thicker mat would have a higher compressibility which would make manufacture challenging. In addition, with a thicker mat wheeled traffic can sink into the material of the mat as it is pushed over it, creating pressure waves that can damage the mat. The support layer may optionally be 1.2 mm to 1.8 mm thick or may optionally be about 1.5 mm thick. The contamination control layer may optionally be about 1 mm to 2 mm thick, or may optionally be about 1.2 mm to 1.8 mm thick.

The polymeric contamination control layer may comprise a blend of polymer and polyester plasticisers. Transparent and translucent polymers and plasticisers for use with these polymers are well known to those skilled in the art. The support layer may comprise a single colour. Generally, the support layer will not be transparent or translucent and will be of a colour that provides a good contrast to the printed material or the polymeric contamination control layer. For example, the support layer may be white and the printing black.

The contamination control mat usually has two layers. However, in a different embodiment, at least one layer may be interposed between the support layer and the polymeric contamination control layer. Any interposed layers must allow the printing on the support layer to be visible through the polymeric contamination control layer. A bottom surface of the support layer may be coated with a further layer. By bottom of the support layer, we mean the surface that opposes the top surface. The bottom surface of the support layer may be provided with an adhesive, such as an adhesive tape. A double-sided tape may be stuck on one side of the tape to the bottom surface, retaining a protective strip on the other side of the tape until the mat is to be installed. Such adhesive tape may be stuck around the border of the mat.

DESCRIPTION OF THE FIGURE

FIG. 1 shows a schematic perspective view of a contamination control mat 10 according to an embodiment of the invention. The mat 10 comprises a glass fibre reinforced polymer support layer 16 that is coated on a top surface with a polymeric contamination control layer 12. The support layer 16 and polymeric contamination control layer 12 are connected at large surfaces and are flush with one another. A border 17 has been printed onto the top surface of the support layer 16. The border 17 runs around, and extends inwards from, the periphery of the top surface of the support layer 16. The polymeric contamination control layer 12 is transparent so that the top surface of the support layer 16, and the border 17, are visible through the polymeric contamination control layer 12.

The mat 10 further comprises a section 13 printed on the top surface of the support layer 16.

In use, the mat 10 is laid on a floor where contamination control is required. The mat 10 is placed such that the contamination control layer 12 is above the support layer 16.

Of course, other embodiments and further additions would be apparent to a person skilled in the art. For example, the contamination control mat may further comprise a section for writing an installation date or keeping a cleaning log. The contamination control mat may comprise a tapered edging region, or further layers that allow, for example, delayed release of antimicrobial agents.

The invention claimed is:

1. A contamination control mat comprising:
   a support layer which is coated on a top surface with a polymeric contamination control layer;
   wherein the support layer comprises a glass fibre reinforced polymer that is 1 mm to 2 mm thick and the top surface of the support layer is printed;
   the polymeric contamination control layer is 0.5 mm to 2.5 mm thick, and is transparent or translucent, so that the print on the support layer is visible through the polymeric contamination control layer;
   the polymeric contamination control layer comprises (a) a blend of (i) polymer material and (ii) polyester plasticisers and (b) at least one antimicrobial agent; and the polymeric contamination control layer coats the support layer permanently.

2. A contamination control mat according to claim 1, wherein the antimicrobial agent is silver nitrate.

3. A contamination control mat according to claim 1, wherein the support layer comprises a single colour.

4. A contamination control mat according to claim 1, wherein the top surface of the support layer has a printed border.

5. A method of providing contamination control, the method comprising deploying a contamination control mat according to claim 1 on a floor in an environment where contamination is to be controlled, such that the polymeric contamination control layer is uppermost.

6. A method according to claim 5, wherein the antimicrobial agent is silver nitrate.

7. A method according to claim 5, wherein the support layer comprises a single colour.

8. A method according to claim 5, wherein the top surface of the support layer has a printed border.

9. A method of making a contamination control mat according to claim 1, the method comprising the steps of a) providing a polymeric layer reinforced with glass fibres as a support layer, b) printing on a top surface of the support layer, and c) coating the top surface of the support layer with a transparent or translucent polymeric contamination control layer.

10. A method according to claim 9, wherein the antimicrobial agent is silver nitrate.

11. A method according to claim 9, wherein the support layer comprises a single colour.

12. A method according to claim 9, wherein the top surface of the support layer has a printed border.

13. A method according to claim 5, wherein the floor is an uneven floor.

14. A method according to claim 5, the method further comprising rolling up the contamination control mat for storage.

15. A contamination control mat according to claim 1, further wherein the polymeric contamination control layer coats the support layer entirely.

16. A method according to claim 5, further wherein the polymeric contamination control layer coats the support layer entirely.

\* \* \* \* \*